US009065937B2

(12) United States Patent
Liang

(10) Patent No.: US 9,065,937 B2
(45) Date of Patent: Jun. 23, 2015

(54) TERMINALS HAVING A TELEVISION FUNCTION AND DISPLAY METHODS

(75) Inventor: Donghua Liang, Haidian District (CN)

(73) Assignees: Lenovo (Beijing) Limited (CN); Beijing Lenovo Software Ltd. (CN)

( * ) Notice: Subject to any disclaimer, the term of this patent is extended or adjusted under 35 U.S.C. 154(b) by 0 days.

(21) Appl. No.: 13/823,452

(22) PCT Filed: Sep. 22, 2011

(86) PCT No.: PCT/CN2011/079980
§ 371 (c)(1),
(2), (4) Date: Mar. 14, 2013

(87) PCT Pub. No.: WO2012/041181
PCT Pub. Date: Apr. 5, 2012

(65) Prior Publication Data
US 2013/0169865 A1 Jul. 4, 2013

(30) Foreign Application Priority Data
Sep. 30, 2010 (CN) .......................... 2010 1 0502074

(51) Int. Cl.
H04N 7/00 (2011.01)
H04N 5/00 (2011.01)
(Continued)

(52) U.S. Cl.
CPC . *H04N 5/00* (2013.01); *H04N 5/44* (2013.01); *H04N 21/4113* (2013.01); *H04N 21/42607* (2013.01); *H04N 21/4436* (2013.01)

(58) Field of Classification Search
USPC .................. 348/705, 706, 552–555, 460, 725
See application file for complete search history.

(56) References Cited

U.S. PATENT DOCUMENTS 5,249,164 A * 9/1993 Koz ............................... 348/552
5,819,156 A * 10/1998 Belmont ......................... 725/14
(Continued)

FOREIGN PATENT DOCUMENTS

| CN | 1391670 A | 1/2003 |
| CN | 1512330 A | 7/2004 |

(Continued)

OTHER PUBLICATIONS
"International Application Serial No. PCT/CN2011/079980, International Search Report mailed Jan. 5, 2012", 2 pgs.

Primary Examiner — Jefferey Harold
Assistant Examiner — Humam Satti
(74) Attorney, Agent, or Firm — Schwegman Lundberg & Woessner, P.A.

(57) ABSTRACT

Disclosed are terminals having a television function and display methods thereof. The terminal comprises a display, a first port, a first hardware system, and a second hardware system, the display is connected with the first hardware system and the second hardware system, the first port is connected with the first hardware system. The first port is adapted to receive a television signal. In a first operation mode, the first hardware system is adapted to generate a first display data to be displayed by the display according to the television signal, and instruct the display to display the first display data. In a second operation mode, the second hardware system is adapted to generate a second display data to be displayed by the display according to the television signal, and instruct the display to display the second display data. A generation procedure of the second display data is different from a generation procedure of the first display data. The display is adapted to display the received first display data or second display data. What is achieved is that the problem of making a television in an all in one device of television & computer operate independently can be addressed, and thereby the stability and utility of the terminals are improved.

6 Claims, 6 Drawing Sheets

(51) Int. Cl.
*H04N 5/44* (2011.01)
*H04N 21/41* (2011.01)
*H04N 21/426* (2011.01)
*H04N 21/443* (2011.01)

(56) References Cited

U.S. PATENT DOCUMENTS

| | | | | |
|---|---|---|---|---|
| 5,986,636 | A * | 11/1999 | Wu | 345/691 |
| 6,262,713 | B1 * | 7/2001 | Brusky et al. | 345/158 |
| 6,275,266 | B1 * | 8/2001 | Morris et al. | 348/552 |
| 6,326,935 | B1 * | 12/2001 | Boger | 345/3.2 |
| 6,788,352 | B2 * | 9/2004 | Kim | 348/553 |
| 7,116,376 | B2 * | 10/2006 | Yun | 348/552 |
| 7,227,590 | B2 * | 6/2007 | Jung et al. | 348/725 |
| 7,394,461 | B2 * | 7/2008 | Lee | 345/212 |
| 7,782,327 | B2 * | 8/2010 | Gonzalez et al. | 345/505 |
| 8,212,827 | B2 * | 7/2012 | Noh et al. | 345/520 |
| 2002/0021372 | A1 * | 2/2002 | Konda et al. | 348/730 |
| 2002/0122046 | A1 * | 9/2002 | Dischert et al. | 345/629 |
| 2004/0051714 | A1 * | 3/2004 | Liao et al. | 345/555 |
| 2005/0231500 | A1 * | 10/2005 | Isobe et al. | 345/211 |
| 2006/0010385 | A1 * | 1/2006 | Sasaki | 715/718 |
| 2006/0119736 | A1 * | 6/2006 | Ogawa | 348/571 |
| 2006/0132476 | A1 * | 6/2006 | Jan | 345/204 |
| 2007/0234084 | A1 * | 10/2007 | Furuta | 713/300 |
| 2009/0106759 | A1 * | 4/2009 | Tseng | 718/102 |
| 2009/0245383 | A1 * | 10/2009 | Mizutani | 375/240.24 |

FOREIGN PATENT DOCUMENTS

| | | |
|---|---|---|
| CN | 1797322 A | 7/2006 |
| CN | 1913595 A | 2/2007 |
| CN | 101355663 A | 1/2009 |
| CN | 101365046 A | 2/2009 |
| CN | 101414453 A | 4/2009 |
| CN | 201360302 Y | 12/2009 |
| KR | 20040064495 A | 7/2004 |
| TW | 502151 B | 9/2002 |

* cited by examiner

TERMINALS HAVING A TELEVISION FUNCTION AND DISPLAY METHODS

RELATED APPLICATIONS

This application is a U.S. National Stage Application filed under 35 U.S.C §371 of International Application Ser. No. PCT/CN2011/079980, filed on Sep. 22, 2011, and published on Apr. 5, 2012 as WO 2012/041181 A1, which application claims priority to Chinese Application No. 201010502074.7, filed Sep. 30, 2010, both of which applications and publication are incorporated herein by reference in their entireties.

BACKGROUND OF THE INVENTION

1. Field of Invention

Embodiments of the present invention relates to a terminal technology field, in particular to terminals having a television function and display methods.

2. Description of Prior Art

As a home digitalization, a variety of digital products, televisions, and computers have been popular. Peoples have gradually proposed a higher requirement of the business and entertainment of the digital, electronic product. An all in one device having the business and entertainment functions gradually became dominant.

Recently, an all in one device of liquid crystal television & computer having a television function will become a favor product for the customer.

But, in the research and practice for the prior art, the inventor found that a user must watch the television depending on a computer when he want to see the television for the present all in one device of liquid crystal television & computer. That is, television signals are converted into digital signals which can be identified by the computer by an analogy to digital conversion firstly, transmitted to the computer by a USB television box or a PCIE television card for a narrowband processing, and on which an image processing is performed by GPU, and then displayed by a liquid crystal screen. That is to say, the television in the all in one device of liquid crystal television & computer cannot operate independently, thereby reducing the utility. Therefore, presently it becomes a hot problem to make the television in the all in one device of liquid crystal television & computer operate independently.

SUMMARY OF THE INVENTION

It is an object of the present invention to provide terminals having a television function and display methods which address the independent operation of a television in a all in one device of television & computer, thereby improve the stability and utility of the terminal.

An embodiment of the present invention is to provide a terminal having a television function which comprises a display, a first port, a first hardware system, and a second hardware system, the display is connected with the first hardware system and the second hardware system, the first port is connected with the first hardware system, wherein, the first port is adapted to receive a television signal; in a first operation mode, the first hardware system is adapted to generate a first display data to be displayed by the display according to the television signal, and instruct the display to display the first display data; in a second operation mode, the second hardware system is adapted to generate a second display data to be displayed by the display according to the television signal, and instruct the display to display the second display data, wherein, a generation procedure of the second display data is different from a generation procedure of the first display data; and the display is adapted to display the received first display data or second display data.

According to an embodiment of the present invention, the first hardware system is further adapted to convert the television signal received by the first port into a digital television signal, and output the digital television signal to the second hardware system.

According to an embodiment of the present invention, the terminal further comprises a trigger adapted to receive a first instruction and/or a second instruction generated by different operations of a user, wherein the first instruction indicates to make the first hardware system be at a operation state, and the second instruction indicates to make the second hardware system be at the operation state.

According to an embodiment of the present invention, the first hardware system comprises an audio and video digital processing unit adapted to generate the first display data to be displayed by the display according to the television signal received by the first port, output the first display data to the display, and generate a first playing data to be played by a speaker according to the television signal received by the first port.

According to an embodiment of the present invention, the first hardware system comprises an analog to digital converter adapted to convert the television signal received by the first port into the digital television signal, and output the digital television signal to the second hardware system.

According to an embodiment of the present invention, the first port is integrated with the first hardware system.

A further embodiment of the present invention is to provide a terminal having a television function which comprises a display, a first port, and a specific image processor, wherein, the specific image processor is connected with the display and the first port, the first port is adapted to receive a television signal; the specific image processor is adapted to program an instruction of entering a television mode into a TV firmware when receiving the instruction, convert the television signal received by the first port into a digital television signal, and process the digital television signal into a first display data which can be displayed by the display, and instruct the display to display the first display data; the display is adapted to display the received the first display data.

According to an embodiment of the present invention, the terminal further comprises a computer hardware system connected with the specific image processor, the specific image processor is adapted to program an instruction of entering a computer mode into a GPU firmware when receiving the instruction, receive a computer data sent by the computer hardware system, and process the computer data into a second display data which can be displayed by the display, and instruct the display to display the second display data; the display is adapted to display the received second display data.

According to an embodiment of the present invention, the terminal further comprises a trigger adapted to generate the instruction of entering the television mode and/or the instruction of entering the computer mode according to the received different operations sent by a user, and trigger the instruction of the specific image processor entering the television mode and/or the instruction of the specific image processor entering the computer mode.

According to an embodiment of the present invention, the specific image processor comprises an EEPROM adapted to store at least the TV firmware and the GPU firmware; a processor; an analog to digital converter adapted to convert the received television signal into the digital television signal, and output the digital television signal to the processor; and a digital signal processor, wherein the processor is adapted to program the instruction of entering the television mode into TV firmware from the EEPROM when receiving the instruction, and instruct a digital signal processor to process the digital television signal after receiving the digital television signal, and send the received first display data processed by the digital signal processor to the display; and/or program the instruction of entering the computer mode into the GPU firmware from the EEPROM when receiving the instruction, and instruct the digital signal processor to process the computer data after receiving the computer data sent by the computer hardware system, and send the received second display data processed by the digital signal processor to the display; the digital signal processor is adapted to process the received digital television signal into the first display data which can be displayed by the display, and feed back the first display data to the processor; and/or process the received computer data into a second display data which can be displayed by the display, and feed back the second display data into the processor.

A yet further embodiment of the present invention is to provide a display method for a terminal, the terminal comprises a display, a first port, a first hardware system, and a second hardware system, the display is connected with the first hardware system and the second hardware system, the first port is connected with the first hardware system, wherein the method comprises: receiving a television signal by the first port; in a first operation mode, by the first hardware system, generating a first display data to be displayed by the display according to the television signal, and instructing the display to display the first display data; in a second operation mode, by the second hardware system, generating a second display data to be displayed by the display according to the television signal, and instructing the display to display the second display data, wherein a generation procedure of the second display data is different from a generation procedure of the first display data; and displaying the received first display data or second display data by the display.

According to an embodiment of the present invention, the display method further comprises: by the first hardware system, converting the television signal received by the first port into a digital television signal, and outputting the digital television signal to the second hardware system.

According to an embodiment of the present invention, the display method further comprises: by a trigger, receiving different operations of a user, and generating a first instruction and/or a second instruction, wherein the first instruction indicates to make the first hardware system be at a operation state, and the second instruction indicates to make the second hardware system be at the operation state.

A yet further embodiment of the present invention is to provide a display method for a terminal, the terminal comprises a display, a first port, and a specific image processor, wherein the specific image processor is connected with the display and the first port, wherein, the method comprises: receiving a television signal by the first port; by the specific image processor programming an instruction of entering a television mode into a TV firmware when receiving the instruction, converting the television signal into a digital television signal, and processing the digital television signal into a first display data which can be displayed by the display, and instructing the display to display the first display data; displaying the received the first display data by the display.

According to an embodiment of the present invention, when the terminal further comprises a computer hardware system connected with the specific image processor, the method further comprises: by the specific image processor, programming an instruction of entering a computer mode into a GPU firmware when receiving the instruction, receiving a computer data sent by the computer hardware system, and processing the computer data into a second display data which can be displayed by the display, and instructing the display to display the second display data; displaying the received second display data by the display.

According to an embodiment of the present invention, when the terminal further comprising a trigger, the method further comprises: by a trigger, generating the instruction of entering the television mode and/or the instruction of entering the computer mode according to the received different operations sent by a user, and triggering the instruction of the specific image processor entering the television mode and/or the instruction of the specific image processor entering the computer mode.

As known from the solution above, the first hardware system and the second hardware system in the embodiment of the present invention both process the received the television signal to obtain the data which can be implemented by the display, and the data may be displayed by the display. The problem of making the television in the all in one device of television & computer operate independently can be addressed, thereby improving the stability and utility of the terminal having the television function.

Furthermore, the embodiment of the present invention may further processes the received television signal by the specific image processor, and the processed data may be displayed by the display, thereby addressing the problem of making the television in the all in one device of television & computer operate independently. Further, the stability and utility of the terminal having the television function can be improved.

DETAILED DESCRIPTION OF THE PREFERRED EMBODIMENTS

A detailed description will be given to the preferred embodiments of the present invention with reference to the figures, in order to make one skilled in the art understand the solution of the present invention better.

Figure 1:
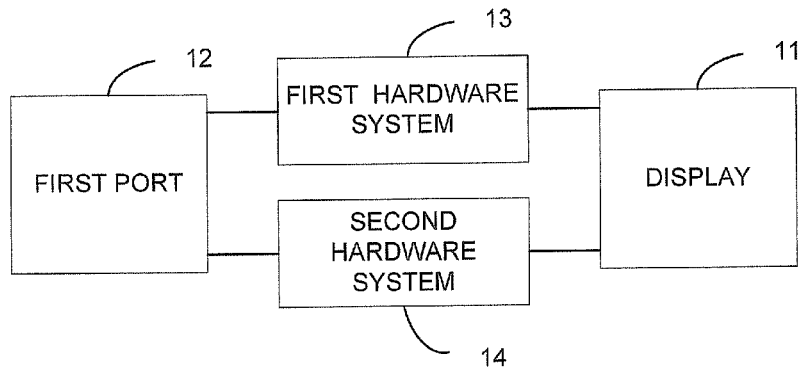
FIG. 1 illustratively shows a terminal having a television function and a display method according to an embodiment of the present invention.

With reference to FIG. 1, a configuration diagram of a terminal having a television function according to an embodiment of the present invention is shown. The terminal includes a display 11, a first port 12, a first hardware system 13, and a second hardware system 14, the display 11 is connected with the first hardware system 13 and the second hardware system 14. The first port 12 is connected with the first hardware system 13 and the second hardware system 14.

The first port 12 receives a television signal. The first hardware system 13 generates a first display data to be displayed by the display 11 according to the television signal, and instructs the display 11 to display the first display data. The second hardware system 14 generates a second display data to be displayed by the display 11 according to the television signal, and instructs the display 11 to display the second display data. A generation procedure of the second display data is different from a generation procedure of the first display data. The display 11 displays the received first display data or second display data.

In this embodiment, the mode at which the first hardware system 13 is may be a television (TV) mode, whereas, the mode at which the second hardware system 14 is may be a computer hardware system (such as PC) mode. A user may enter the television (TV) mode when he only wants to watch the television. That is, the first hardware system 13 may process the television signal received by the first port into the first display data which can be displayed by the display, and the first display data may be displayed by the display 11. The user may record and share the watched television program by a network when he wants to watch the television through the computer hardware system. In other words, the user may make the terminal having television function enter a mode of television card (that is, TVPC mode) when he want to watch the television on the terminal using PC. The second hardware system 14 may process the television signal into the second display data which can be displayed by the display, and the second display signal may be displayed by the display 11. The generation procedure of the second display data is different from the generation procedure of the first display data.

According to one embodiment of the present invention, the first hardware system 13 may further convert the television signal into a digital television signal, then output to the second hardware system 14.

According to one embodiment of the present invention, the first hardware system 13 may further convert the television signal received by the first port into a digital television signal firstly, then output it to the second hardware system 14. The second hardware system 14 may process the digital television signal into the second display data which can be displayed by the display, and the second display signal may be displayed by the display 11.

Though the above embodiment is exampled as the first hardware system 13 having analog to digital conversion function, it is not limited to this. Alternatively, the second hardware system 14 may convert the received television signal into the digital signal firstly, then process the digital television signal into the second display data which can be displayed by the display, and the second display signal may be displayed by the display 11.

The embodiment of the present invention addresses independent operation of the television in an all in one device of television & computer, thereby improves the stability and utility of the terminal having the television function.

Preferably, the terminal further comprises a trigger (not shown) adapted to receive a first instruction and/or a second instruction generated by different operations of a user. The first instruction indicates to make the first hardware system 13 be at an operation state. The second instruction indicates to make the second hardware system be at the operation state. A power manager system of the terminal may supply power to the first hardware system 13 in response to the first instruction, and make the first hardware system 13 be at an operation state. The power manager system of the terminal may supply power to the second hardware system 14 in response to the second instruction, and make the second hardware system 14 be at the operation state. Optionally, the first hardware system 13 itself may response to the first instruction to switch from a un-operation state to the operation state; the second hardware system 14 itself may response to the second instruction to switch from the un-operation state to the operation state.

In this embodiment, the trigger may be a power switch, also another device which has a switching function. This embodiment is not limited to this. In this embodiment, the user may operate (for example, pressing operation) a first trigger to generate the first instruction (that is, an instruction entering the television mode) if he wants to watch the television. The first instruction make the first hardware system 13 be at the operation state. The power manager system of the terminal may supply power to the first hardware system 13 in response to the first instruction so as to make the first hardware system 13 be at the operation state. Then, the first hardware system 13 may process the received television signal into the first display data which can be displayed by the display, and the first display data may be displayed by the display 11. At the same time, the user may again operate (for example long pressing operation) the trigger to trigger a operation which is different from the operation entering the television mode so as to generate the second instruction (that is, a instruction entering PC mode), if he wants to record the program played by the television by the computer hardware system. The second instruction make the second hardware system 14 be at the operation state. The power manager system of the terminal may supply power to the second hardware system 14 in response to the second instruction so as to make the second hardware system 14 be at the operation state. The second hardware system 14 may process the received digital television signal into the second display data which can be displayed by the display, and the second display data may be displayed by the display 11. At the same time, the second hardware system may start up its recording function and record the played television program. Further, the power manager system of the terminal closes the power supply to the first hardware system 13, while it supplies the power to the second hardware system 14 in response to the second instruction.

According to a further embodiment of the invention, the first hardware system 13 may further comprise a video digital signal processing unit adapted to generate the first display data to be displayed by the display 11 according to the television signal received by the first port 12, output the first display data to the display 11.

According to a yet further embodiment of the present invention, the first hardware system 12 may further comprise an analog to digital converter adapted to convert the television signal received by the first port 12 into the digital television signal, and output the digital television signal to the second hardware system 14. It is illustrated that the second hardware system 14 may also have the analog to digital converter adapted to the received analogy signal into a digital signal. This embodiment is only exampled as the first hardware system 13 having an analogy to digital conversion, but is not limited to this.

According to a yet further embodiment of the present invention, the first port 12 may be integrated with the first hardware system 13, and also arranged in the terminal independently.

According to a yet further embodiment of the present invention, the second hardware system 14 is further adapted to receive a computer data sent by the user, and generate the second display data to be displayed by the display 11 according to the computer data, instruct the display 11 to display the second display data.

That is to say, the second hardware system 14 in this embodiment may independently process the computer data sent by the user, and process the computer data into the second display data which can be displayed by the display 11. The second display data can be displayed by the display 11, for example, the user can play a game on the computer, etc.

In this embodiment, the second hardware system 14 may be a computer hardware system, and also be a device having the computer function, but this embodiment is not limited to this.

To facilitate understand of the one skilled in the art, a particular implementation is explained as follow.

With reference to FIG. 2 again, a schematic diagram in which a terminal having a television function enters a TV mode according to a first embodiment of the present invention is illustratively shown. In this embodiment, the terminal comprises a display (for example, a liquid crystal screen) 21 and a first hardware system 22. The terminal also comprises a power supply 23. The first hardware system 22 comprises an audio and video data signal processor 221. The first hardware system is exampled as a television hardware system, and a first port (not shown) is exampled to be integrated with the first hardware system 22, but it is not limited to this.

Figure 2:
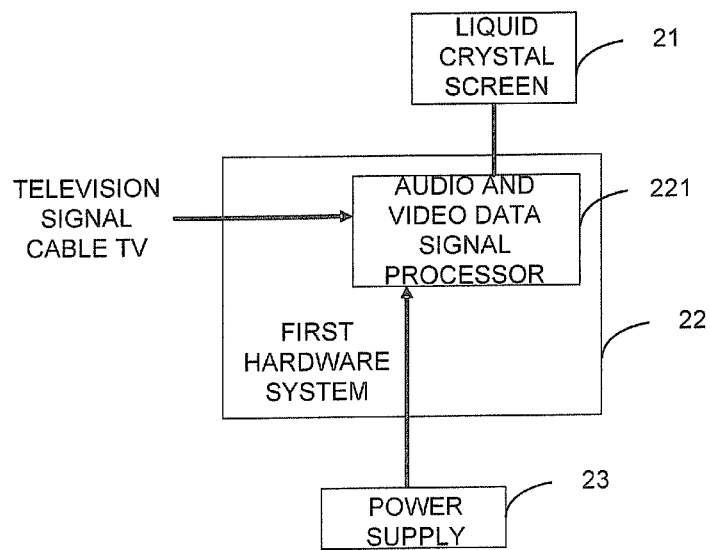
FIG. 2 illustratively shows a schematic diagram in which a terminal having a television function enters a TV mode according to a first embodiment of the present invention.

As shown in FIG. 2, the user may control the power supply 23 to supply power to the audio and video data signal processor 221 by a trigger, if he only wants to watch the television, so as to make the audio and video data signal processor 221 be at the operation state. At the same time, the power supply 23 is started up to supply the power to the liquid crystal screen 21. Then, after the first port receives the television signal, the audio and video data signal processor 221 may process the television signal received by the first port into the first display data which can be displayed by the display 21, and display the first display data by the display 21, and generate a first playing data to be played by a speaker according to the television signal received by the first port.

The procedure of controlling the power supply 23 to supply power to the audio and video data signal processor 221 by a trigger comprises: when selecting TV mode, a MCU may select Power to open a respective power supply of TV through a mode instruction given by infrared; when selecting PC mode, the MCU may select Power to open a respective power supply of PC through a mode instruction given by infrared; when selecting TVPC mode, the MCU may select Power to simultaneity open a respective power supply of TVPC through a mode instruction given by infrared.

In this embodiment, the power supply can supply the power to TV independently, that is, the terminal having the television function enters a TV mode, the audio and video data signal processor in the terminal may process the received television signal to obtain the television data which can be displayed by the liquid crystal screen, and display the television data by the liquid crystal screen, and generate a first playing data to be played by a speaker according to the television signal received by the first port.

With reference to FIG. 3 again, a schematic diagram in which a terminal having a television function enters a TVPC mode according to a second embodiment of the present invention is illustratively shown. An operation procedure is shown as a solid line in FIG. 3. In this embodiment, the terminal comprises a display (for example a liquid crystal screen) 21, a first hardware system 22, and a second hardware system 24. The terminal also comprises a power supply 23. The first hardware system 22 is exampled as TV22, which comprises an analogy to digital converter 222. The second hardware system 24 is exampled as PC, which comprises a central processor 241, an image processor 242, a north bridge 243, and a south bridge 244, but is not limited to this. The first port may be integrated with the first hardware system 22 or with the second hardware system 24, and may also arranged in the terminal independently. This embodiment is exampled to be integrated with the first hardware system 22.

Figure 3:
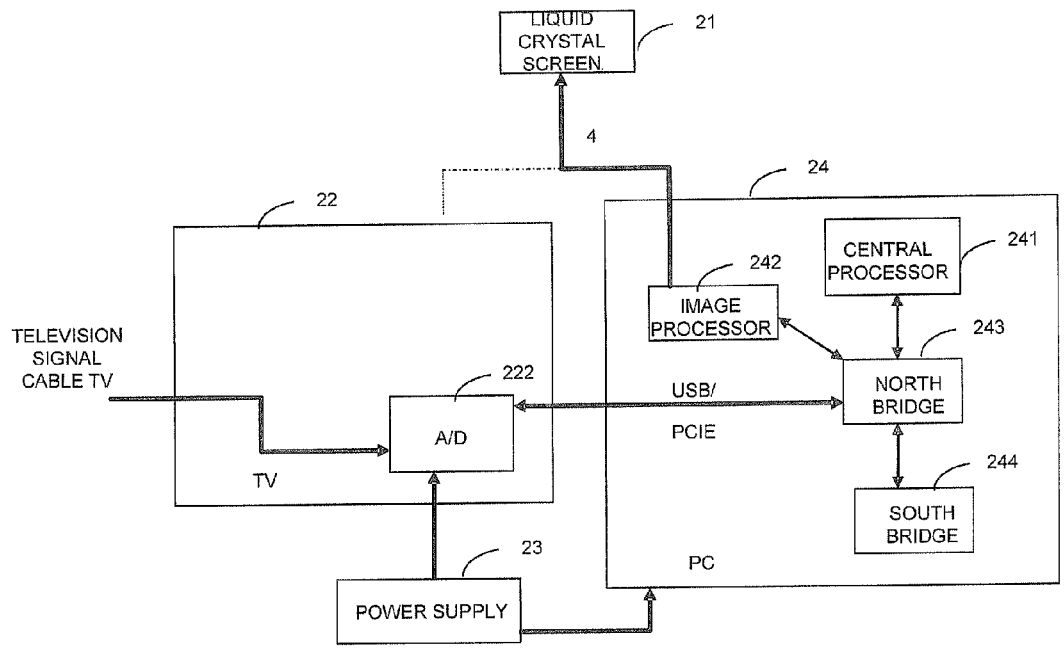
FIG. 3 illustratively shows a schematic diagram in which a terminal having a television function enters a TVPC mode according to a second embodiment of the present invention.

As shown in FIG. 3, firstly, the user may start up the power supply 23 to supply power to the analogy to digital converter 222, the PC 24, and the liquid crystal screen 21 (for example LCD) by a trigger simultaneity, if he wants to record the displayed program through the computer. After the first port receives the television signal, the Analogy to digital converter 222 may convert television signal into the digital television signal, and output the digital television signal to the north bridge 243 in the second hardware system 24. The digital television signal may be a signal such as a USB signal or a PCIE signal which can be identified by the image processor 242 in the PC 24. The north bridge 243 performs a signal bridging according to the digital television signal after receiving the digital television signal, and sends the converted digital television signal to the image processor 242. The image processor 242 may process the converted digital television signal to obtain the second display data (i.e. processed digital television signal) which can be displayed by the liquid crystal screen, and display the second display data by the liquid crystal screen.

In this embodiment, the power supply can supply the power to the TV, the PC independently, that is, the terminal having the television function enters a TVPC mode, the analogy to digital converter in the terminal may convert the received television signal, that is the television signal is converted into the digital television signal such as a USB signal or a PCIE signal which can be identified by the PC. Then, the analogy to digital converter may send the converted digital television signal to the PC, the north bridge and the image processor in the PC for processing the digital television signal, to obtain the digital television data which can be displayed by the liquid crystal screen. In this procedure, the PC may start up a recording function, record the television program displayed by the liquid crystal screen, to satisfy the user's requirement, thereby improving the utility.

Figure 4:
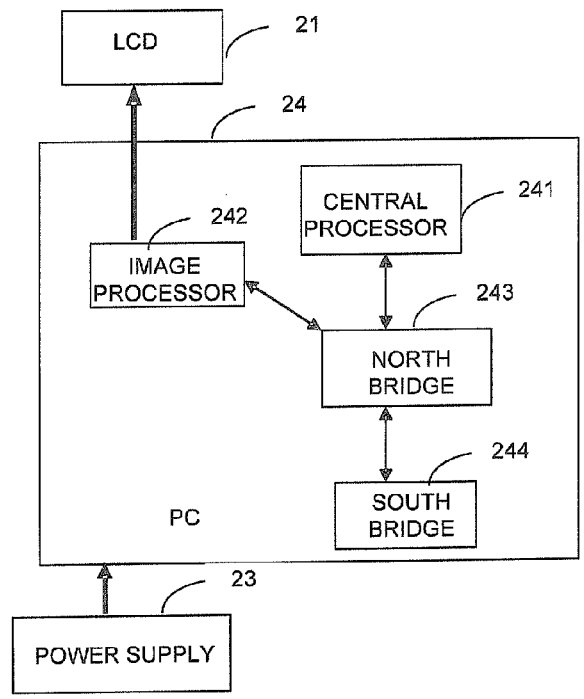
FIG. 4 illustratively shows a schematic diagram in which a terminal having a television function enters a PC mode according to a third embodiment of the present invention.

With reference to FIG. 4, a schematic diagram in which a terminal having a television function enters a PC mode according to a third embodiment of the present invention is illustratively shown. In this embodiment, the terminal comprises a display (for example, a liquid crystal screen) 21 and a second hardware system 24. The second hardware system 24 is exampled as a PC, which comprises a central processor 241, an image processor 242, a north bridge 243, and a south bridge 244.

As shown in FIG. 4, the user may start up the power supply 23 to supply power to the PC 24 and the liquid crystal screen 21, if he only wants to play a game or work on the PC. Then, the north bridge may bridge a computer data after receiving the computer data, and convert the computer data into a computer data which can be identified by the image processor 242, then send the processed computer data to the image processor 242. The image processor may process the received computer data, to obtain the computer data which can be identified by the liquid crystal screen 21, and display the computer data by the liquid crystal screen.

In this embodiment, the power supply supplies the power to only the PC, in order to perform a respective operation on the PC by the user.

Figure 5:
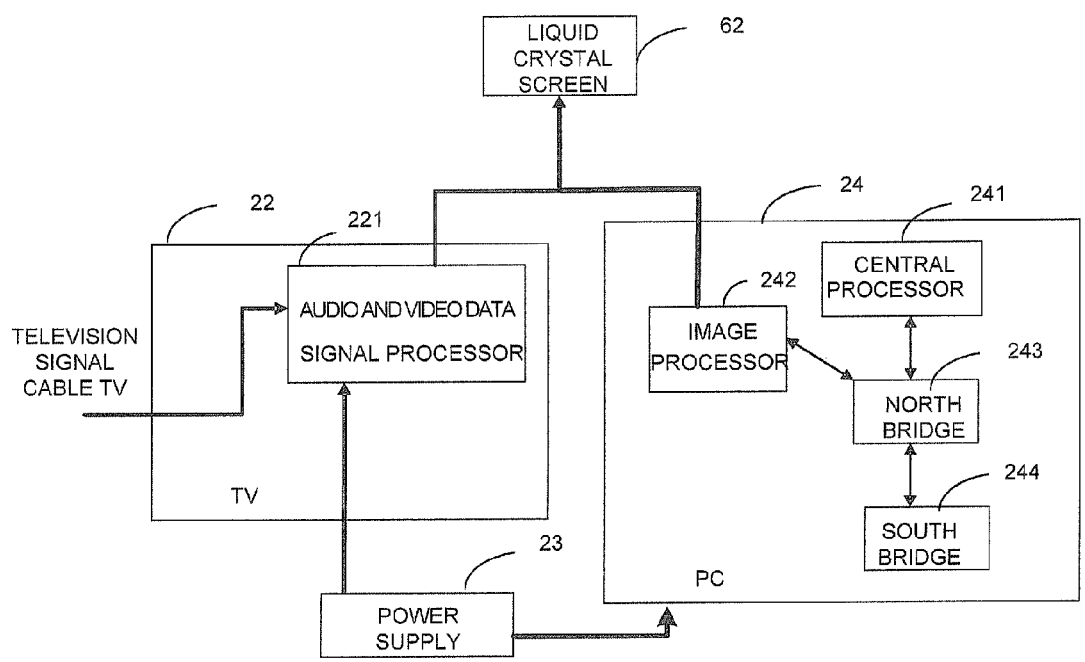
FIG. 5 illustratively shows a schematic diagram in which a terminal having a television function enters a TV mode and a PC mode according to a fourth embodiment of the present invention.

As shown in FIG. 5, a schematic diagram in which a terminal having a television function enters a TV mode and a PC mode according to a fourth embodiment of the present invention is illustratively shown. An operation procedure is shown as a solid line in FIG. 5. In this embodiment, the user can play the PC (for example, play the game, etc.) when watching the television, the power supply 23 may supply the power to the TV, the PC, and the liquid crystal screen simultaneity, the procedure of supplying the power to the liquid crystal screen is not shown.

This embodiment may be a combination of FIG. 2 and FIG. 4. As for a procedure of watching only the television, please see FIG. 2 for details. As for the procedure of playing the game, please see FIG. 4. At the same time, the liquid crystal screen can both display the television data and the computer data. A manner can be used to divide the liquid crystal screen into two areas, to display the television data and the computer data. But it is not limited to this, the other manner can also be used.

Figure 6:
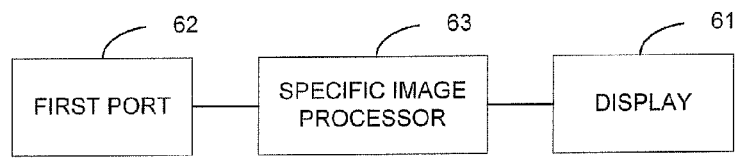
FIG. 6 illustratively shows a structure diagram of a terminal having a further television function according to an embodiment of the present invention.

An embodiment of the present invention further provides a terminal having a television function, and FIG. 6 shows the structure diagram of it. The terminal comprises: a display 61, a first port 62, and a specific image processor 63. The specific image processor is connected with the display 61 and the first port 62. The first port 62 is adapted to receive a television signal. The specific image processor 63 is adapted to program an instruction of entering a television mode into a TV firmware when receiving the instruction, convert the television signal received by the first port 62 into a digital television signal, and process the digital television signal into a first display data which can be displayed by the display 61, and instruct the display 61 to display the first display data. The display 61 is adapted to display the received first display data.

According to a further embodiment of the present invention, the terminal may further comprise a computer hardware system connected with the specific image processor.

The specific image processor is adapted to program an instruction of entering a computer mode into a GPU firmware when receiving the instruction, receive a computer data sent by the computer hardware system, and process the computer data into a second display data which can be displayed by the display, and instruct the display to display the second display data. The display is adapted to display the received second display data.

The terminal further comprises a trigger adapted to generate the instruction of entering the television mode and/or the instruction of entering the computer mode according to the received different operations sent by a user, and trigger the instruction of the specific image processor entering the television mode and/or the instruction of the specific image processor entering the computer mode.

According to an embodiment of the present invention, the specific image processor comprises an EEPROM, an analogy to digital converter, a processor, and a digital signal processor, etc.

The EEPROM is adapted to store at least the TV firmware and the GPU firmware. The analog to digital converter is adapted to convert the received television signal into the digital television signal, and output the digital television signal to the processor.

The processor is adapted to program the instruction of entering the television mode into TV firmware from the EEPROM when receiving the instruction, and instruct a digital signal processor to process the digital television signal after receiving the digital television signal, and send the received first display data processed by the digital signal processor to the display; and/or program the instruction of entering the computer mode into the GPU firmware from the EEPROM when receiving the instruction, and instruct the digital signal processor to process the computer data after receiving the computer data sent by the computer hardware system, and send the received second display data processed by the digital signal processor to the display.

The digital signal processor is adapted to process the received digital television signal into the first display data which can be displayed by the display, feed back the first display data to the processor; and/or process the received computer data into a second display data which can be displayed by the display, and feed back the second display data into the processor.

To facilitate understand of the one skilled in the art, a particular implementation is explained as follow.

With reference to FIG. 7 again, a schematic diagram in which a terminal having a further television function enters a TV mode according to a first embodiment of the present invention is illustratively shown. In this embodiment, the terminal comprises a display (i.e. LCD) 61, a first port 62, and a specific image processor 63. The specific image processor 63 is connected with the display 61 and the first port 62. The specific image processor 63 comprises an analogy to digital converter 631, a processor 632, an EEPROM 633, and a digital signal processor 634, further comprises memory DDR 635.

Figure 7:
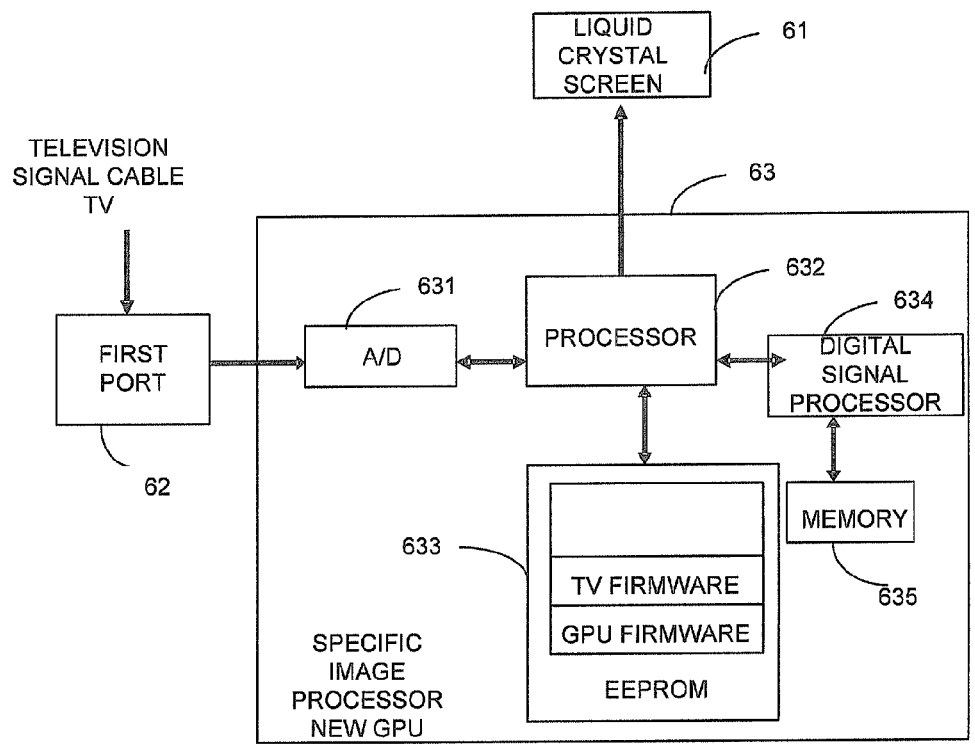
FIG. 7 illustratively shows a schematic diagram in which a terminal having a further television function enters a TV mode according to a first embodiment of the present invention.

As shown in FIG. 7, the EEPROM may store at least the TV firmware and the GPU firmware in advance. The processor may first program the instruction of entering the television mode into TV firmware from the EEPROM when receiving the instruction, the first port 62 send the received television signal to the analogy to digital converter 631. The analogy to digital converter 631 the television signal into the digital television signal, and output the digital television signal to the processor 632. The processor may instruct the digital signal processor 634 to process the digital television signal. The digital signal processor may process the received digital television signal into the first display data which can be displayed by the display 61, and feed back the first display data to the processor. The processor 632 may send the received first display data to the display 61. The display 61 may display the first display data.

Furthermore, the digital signal processor 634 may further buffer the received digital television signal and the processed first display data in the memory 635.

Figure 8:
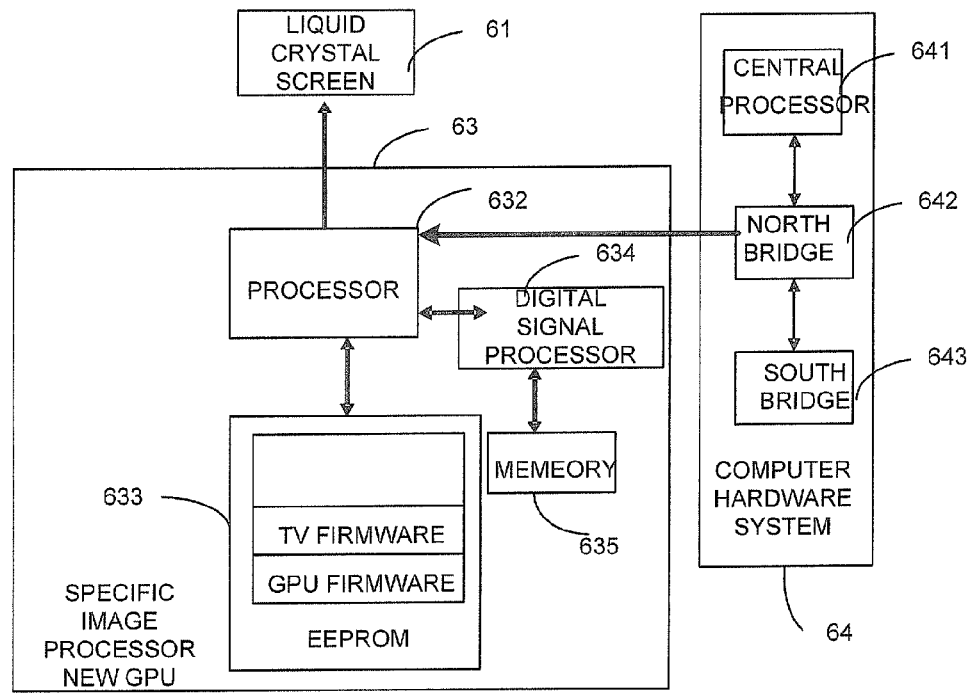
FIG. 8 illustratively shows a schematic diagram in which a terminal having a further television function enters a PC mode according to a second embodiment of the present invention.

Based on FIG. 7, the terminal further comprises a computer hardware system 64 connected with the processor. The computer hardware system 64 comprises a central processor 641, a north bridge 642, and a south bridge 643, and FIG. 8 show the structure diagram of it. FIG. 8 illustratively shows a schematic diagram in which a terminal having a further television function enters a PC mode according to a second embodiment of the present invention. As shown in FIG. 8, the processor first may program the instruction of starting up the PC system mode into the GPU firmware from the EEPROM 633 when receiving the instruction, and instruct a digital signal processor 634 to process the computer data after receiving the computer data sent by the north bridge 642 of the computer hardware system 64. The digital signal processor 634 may process the received computer data into the second display data which can by display by the display 61, and feed back the second display data to the processor 632. The processor 632 may send the received second display data processed by the digital signal processor 643 to the display 61. The display 61 may display the second display data.

With reference to FIG. 9 again, a schematic diagram in which a terminal having a further television function enters a TV mode and a PC mode according to a third embodiment of the present invention is illustratively shown. This embodiment combines the content in FIGS. 7 and 8. That is to say, the specific image processor 63 in this embodiment may process the television signal and computer data simultaneity, for example, the user may play the game while watching the television.

Figure 9:
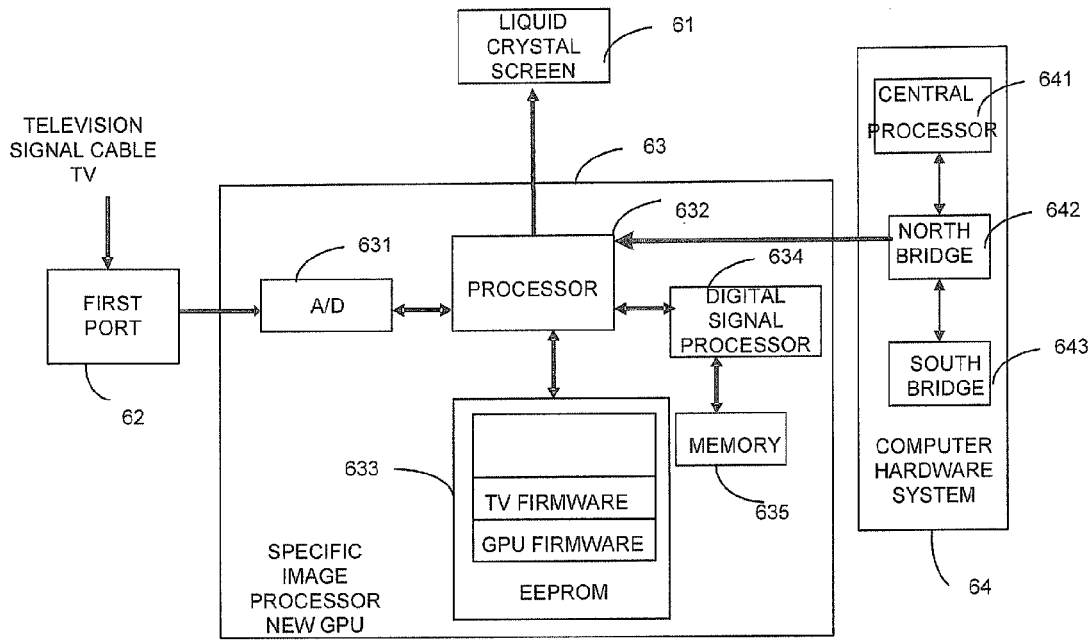
FIG. 9 illustratively shows a schematic diagram in which a terminal having a further television function enters a TV mode and a PC mode according to a third embodiment of the present invention.

As shown in FIG. 9, a power supply manager system (such as a power supply) is control to supply power to the specific image processor 63, the LCD 61, and the PC system by a trigger firstly. The processor may program the instruction of starting up the TV system mode into TV firmware from the EEPROM 633 when receiving the instruction, and program the instruction of entering the PC system mode into the GPU firmware from the EEPROM 633 when receiving the instruction, and process the received television signal and computer data respectively, to obtain the first display data and the second display data which can be displayed by the display. As for the procedure of processing the television, please see the first embodiment as shown in FIG. 7 for detail. As for the procedure of processing the computer data, please see the second embodiment as shown in FIG. 8 for detail. Then, the processor may make the first display data and the second display data be displayed by the display.

Figure 10:
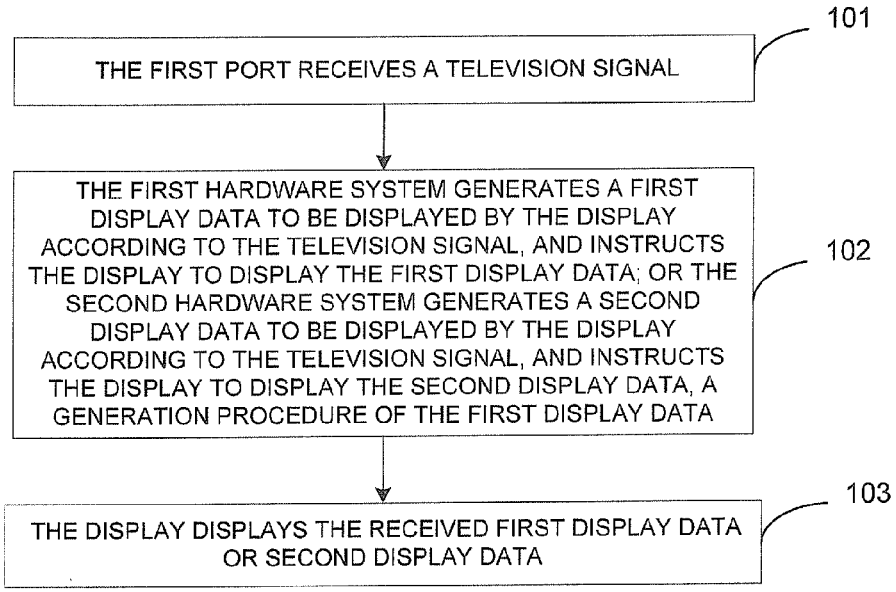
FIG. 10 illustratively shows a flowchart of a display method according to an embodiment of the present invention.

With reference to FIG. 10, a flowchart of a display method according to an embodiment of the present invention is illustratively shown. The display method is applied for a terminal, the terminal comprises a display, a first port, a first hardware system, and a second hardware system, the display is connected with the first hardware system and the second hardware system, the first port is connected with the first hardware system, wherein the method comprises the following steps.

At step 101, the first port receives a television signal.

At step 102, the first hardware system generates a first display data to be displayed by the display according to the television signal, and instructs the display to display the first display data; or the second hardware system generates a second display data to be displayed by the display according to the television signal, and instructs the display to display the second display data, a generation procedure of the second display data is different from a generation procedure of the first display data.

At step 103, the display displays the received first display data or second display data.

According to a further embodiment of the present invention, the method further comprises: the first hardware system further converts the television signal received by the first port into a digital television signal, and outputs the digital television signal to the second hardware system.

According to a yet further embodiment, the method further comprises: a trigger receives different operations of a user, and generates a first instruction and/or a second instruction according to the different operations, the first instruction indicates to make the first hardware system be at a operation state, and the second instruction indicates to make the second hardware system be at the operation state.

Figure 11:
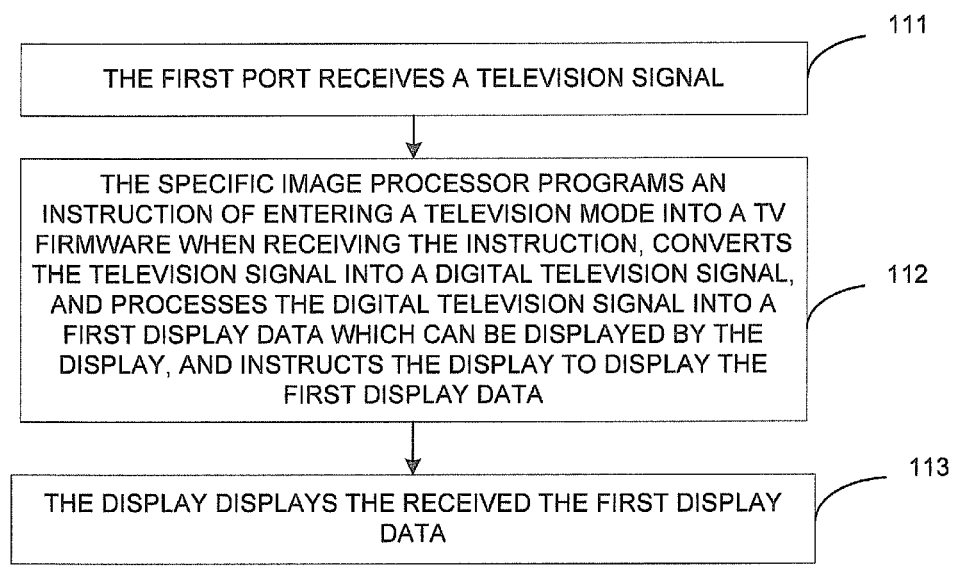
FIG. 11 illustratively shows a flowchart of a further display method according to an embodiment of the present invention.

With reference to FIG. 11, the embodiment of the present invention provides a further display method. The method is applied for a terminal, the terminal comprises a display, a first port, and a specific image processor, wherein the specific image processor is connected with the display and the first port, wherein, the method comprises the following steps.

At step 111, the first port receives a television signal.

At step 112, the specific image processor programs an instruction of entering a television mode into a TV firmware when receiving the instruction, converts the television signal into a digital television signal, and processing the digital television signal into a first display data which can be displayed by the display, and instructing the display to display the first display data.

At step 113, the display displays the received the first display data.

According to one embodiment, when the terminal further comprises a computer hardware system connected with the specific image processor, the method further comprises the following steps.

The specific image processor programs an instruction of entering a computer mode into a GPU firmware when receiving the instruction, receives a computer data sent by the computer hardware system, and processes the computer data into a second display data which can be displayed by the display, and instructs the display to display the second display data.

The display further displays the received second display data.

According to a further embodiment, when the terminal further comprising a trigger, the method further comprises: a trigger generates the instruction of entering the television mode and/or the instruction of entering the computer mode according to the received different operations sent by a user, and triggers the instruction of the specific image processor entering the television mode and/or the instruction of the specific image processor entering the computer mode.

As known from the above solution, when the first port receives the television signal, the first hardware system may generate the television signal into the first display data to be displayed by the display from the television signal, and display the first display data by the display, or the second hardware system may generate the television signal into the second display data to be displayed by the display from the television signal, and display the second display data by the display. The generation procedure of the second display data is different from the generation procedure of the first display data. That is to say, when the user wants to watch the television, the terminal having the television function is made to enter the TV set mode, the first hardware system processes the received television signal, to obtain the first display data displayed by the display, and displays the data by the display. When the user wants to make the television have a television recording function and a network sharing function, the terminal having television function is made to enter the computer mode, that is, the second hardware system processes the received television signal, to obtain the second display data which can be displayed by the display, and displays the second display data by the display. The processing of received television signal by the second hardware system comprises:

first converting the television signal into the digital television signal, then processing the digital television signal, to obtain the second display data.

In this embodiment, when the user wants to watch the television, after the specific image processor programs an instruction of entering a television mode into a TV firmware when receiving the instruction, the received television signal is processed, to obtain the first display data. Or, the specific image processor programs an instruction of entering a computer mode into a TV firmware when receiving the instruction, receives the computer data sent by the computer hardware system, and processes the computer data into the second display data which can be displayed by the display, and displays the specific image processor programs an instruction of entering a television mode into a TV firmware when receiving the instruction, the received television signal is processed, to obtained the first display data. Of course, the display can display the first display data and the second display data simultaneously.

Thus, the embodiment of the present invention have addressed the problem of making a television in an all in one device of television & computer operate independently, thereby improving the stability and utility of the terminal having the television function.

Herein, terms such as "first" and "second" are only for distinguishing an entity or operation from another one, other than specifying or implying certain sequence of these entities or operations. Terms "comprise," "include" and any variants thereof are not exclusive. That a process, method, article or device includes some elements means that such process, method, article or device may include additional or intrinsic elements other than the explicitly listed elements. The phase "including an element" does not exclude that more than one such element is included.

Based on the description of exemplary embodiments, those skilled in the art will understand that the exemplary embodiments may be implemented in a general hardware platform programmed with software, or entirely in hardware. The former implementation is preferred in most cases. The exemplary embodiments may be implemented in the form of computer software product which can be stored in some storage medium, such as ROM/RAM, magnetic disk, optical disk. The computer software product may include instructions that cause a computer (e.g., PC, server or network device) to execute methods according to some of the exemplary embodiments or part thereof.

While some embodiments of the present invention have been described, it should be noted that many changes and modifications can be made by those skilled in the art without departing from the principle of the present invention. These changes and modifications are encompassed by the scope of the present invention.

What is claimed is:

1. A terminal having a television function and a computer function, comprising:
    a display,
    a first port,
    a specific image processor, and
    a computer hardware system,
    wherein, the specific image processor is connected with the display, the first port, and the computer hardware system, and is separate from a central processor included in the computer hardware system;
    the first port is adapted to receive a television signal;
    the specific image processor is adapted to program an instruction of entering a television mode into a TV firmware when receiving the instruction, convert the television signal received by the first port into a digital television signal, and process the digital television signal into a first display data which can be displayed by the display, and instruct the display to display the first display data;
    the display is adapted to display the received the first display data;
    the specific image processor comprises:
        an EEPROM adapted to store at least the TV firmware and the GPU firmware;
        a processor;
        an analog to digital converter adapted to convert the received television signal into the digital television signal, and output the digital television signal to the processor; and
        a digital signal processor,
        wherein the processor is adapted to program the instruction of entering the television mode into TV firmware from the EEPROM when receiving the instruction, and instruct the digital signal processor to process the digital television signal after receiving the digital television signal, and send the received first display data processed by the digital signal processor to the display; and/or program the instruction of entering the computer mode into the GPU firmware from the EEPROM when receiving the instruction, and instruct the digital signal processor to process the computer data after receiving the computer data sent by the computer hardware system, and send the received second display data processed by the digital signal processor to the display;
        the digital signal processor is adapted to process the received digital television signal into the first display data which can be displayed by the display, and feed back the first display data to the processor; and/or process the received computer data into a second display data which can be displayed by the display, and feed back the second display data into the processor.

2. The terminal according to claim 1, further comprising a computer hardware system connected with the specific image processor,
    the specific image processor is adapted to program an instruction of entering a computer mode into a GPU firmware when receiving the instruction, receive a computer data sent by the computer hardware system, and process the computer data into a second display data which can be displayed by the display, and instruct the display to display the second display data;
    the display is adapted to display the received second display data.

3. The terminal according to claim 1, further comprising:
    a trigger adapted to generate the instruction of entering the television mode and/or the instruction of entering the computer mode according to the received different operations sent by a user, and trigger the instruction of the specific image processor entering the television mode and/or the instruction of the specific image processor entering the computer mode.

4. A display method for a terminal,
    the terminal has a television function and a computer function, and comprises a display, a first port, a specific image processor, and a computer hardware system,
    wherein the specific image processor is connected with the display, the first port, and the computer hardware system, and is separate from a central processor included in the computer hardware system, wherein, the method comprises:

receiving a television signal by the first port;

by the specific image processor programming an instruction of entering a television mode into a TV firmware when receiving the instruction, converting the television signal into a digital television signal, and processing the digital television signal into a first display data which can be displayed by the display, and instructing the display to display the first display data;

displaying the received the first display data by the display;

wherein the specific image processor comprises:
- an EEPROM adapted to store at least the TV firmware and the GPU firmware;
- a processor;
- an analog to digital converter adapted to convert the received television signal into the digital television signal, and output the digital television signal to the processor; and
- a digital signal processor,
- wherein the processor is adapted to program the instruction of entering the television mode into TV firmware from the EEPROM when receiving the instruction, and instruct the digital signal processor to process the digital television signal after receiving the digital television signal, and send the received first display data processed by the digital signal processor to the display; and/or program the instruction of entering the computer mode into the GPU firmware from the EEPROM when receiving the instruction, and instruct the digital signal processor to process the computer data after receiving the computer data sent by the computer hardware system, and send the received second display data processed by the digital signal processor to the display;
- the digital signal processor is adapted to process the received digital television signal into the first display data which can be displayed by the display, and feed back the first display data to the processor; and/or process the received computer data into a second display data which can be displayed by the display, and feed back the second display data into the processor.

5. The display method according to claim 4, wherein when the terminal further comprises a computer hardware system connected with the specific image processor, the method further comprises:

by the specific image processor, programming an instruction of entering a computer mode into a GPU firmware when receiving the instruction, receiving a computer data sent by the computer hardware system, and processing the computer data into a second display data which can be displayed by the display, and instructing the display to display the second display data;

displaying the received second display data by the display.

6. The display method according to claim 4, wherein when the terminal further comprising a trigger, the method further comprises:

by a trigger, generating the instruction of entering the television mode and/or the instruction of entering the computer mode according to the received different operations sent by a user, and triggering the instruction of the specific image processor entering the television mode and/or the instruction of the specific image processor entering the computer mode.

* * * * *